Dec. 27, 1966  G. R. SPIES, JR  3,294,953
PLASMA TORCH ELECTRODE AND ASSEMBLY
Filed Dec. 19, 1963
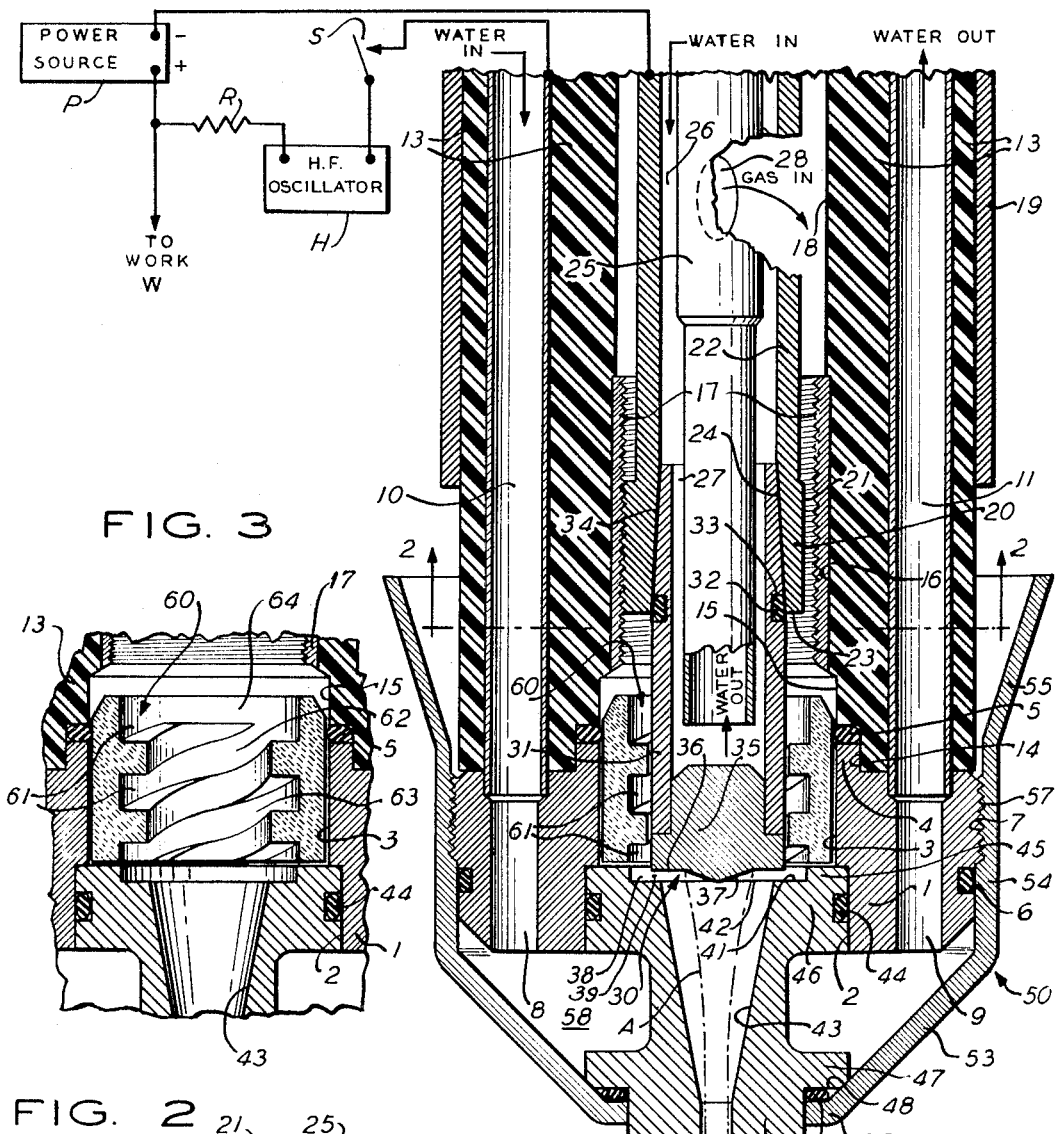
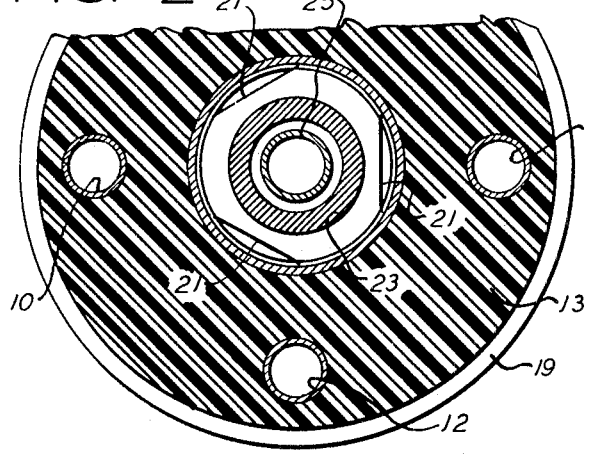
INVENTOR.
GEORGE R. SPIES, JR.
BY *Edmund C. Kopp*
AGENT

United States Patent Office 3,294,953
Patented Dec. 27, 1966

3,294,953
PLASMA TORCH ELECTRODE AND ASSEMBLY
George R. Spies, Jr., Murray Hill, N.J., assignor to Air
 Reduction Company, Incorporated, New York, N.Y.,
 a corporation of New York
Filed Dec. 19, 1963, Ser. No. 331,882
14 Claims. (Cl. 219—121)

This invention relates to a plasma torch electrode and assembly. Such a torch is of course one from which there emerges an arc stream in the form of an intense and constricted ionized gas plasma, by which various functions such as the cutting of work may be performed. While it may have broader utility, the invention is especially concerned with an electrode and assembly for a plasma torch to be used in the so-called "transferred arc" system, in which after the initiation of an arc stream its anode extremity is transferred to the work.

One of the problems presented in such torches is that of electrode life, and objects of the invention are to provide an electrode which, and an electrode assembly in which, that life is improved.

In such torches it is normally necessary to provide cooling facilities for the electrode and for other parts of the electrode assembly. It is an object of the invention to provide improved such cooling facilities.

Especially because of the requirement for cooling facilities, the construction of such torches tends to become complex, and the task of inserting and removing the electrode a troublesome one. Objects of the invention are to provide a relatively simple torch construction, and one in and from which the electrode may be inserted and removed with relative ease.

Such torches require among other things arrangements and structures for the particular function of starting the arc discharge. An object of the invention is to provide a structure improved in respect of the starting function.

It is known in such torches for various beneficial purposes to impart to the gas, which the plasma comprises in ionized form, a whirling or vortical motion. An object of the invention is to impart such motion in a manner which is improved and which accomplishes new and improved results.

Allied and other objects will appear from the following description and the appended claims.

Briefly, the invention in one aspect comprises an electrode member having a forward face and a nozzle member having a rear face and therein a rear orifice, the forward electrode-member face having a transverse dimension at least slightly greater than that of the rear nozzle-member orifice and overlying that orifice with its marginal portion forming with the rear nozzle-member face a thin annular aperture. The electrode and nozzle members may be electrically insulated from each other and means may be electrically connected between them for creating across the thin annular aperture a starting discharge. The position of one of the members may be forwardly and rearwardly adjustable for control of the thickness of the annular aperture. Through the annular aperture there may be introduced a spiral flow of gas contracting along the forward electrode-member face. That face may centrally comprise an obtuse protuberance against which that sprial flow is directed, and that protuberance may be of transverse dimension appreciably smaller than that of the rear nozzle-member orifice.

In another aspect the invention comprises a generally cylindrical electrode member terminating in a forward face, a member surrounding the electrode member, one of the members in its surface toward the other being provided with helical grooving to form a helical conduit, and means connected with the rear extremity of the helical conduit for supplying gas thereto for conduction thereby to the vicinity of the forward electrode-member face. Means may be provided in close spaced relationship to the electrode face for deflecting the helical flow into a spiral flow contracting along that face.

In another aspect the invention comprises an electrode having an end surface in the form of a substantially flat annulus and of a protuberance, for example substantially conical and obtuse, from and surrounded by the annulus. The electrode may be secured across one end of a metal tube of which an external portion adjacent its other end may be provided with a self-locking taper; that portion may further be provided with a circumferential recess in which a resilient O-ring is retained.

Other particular aspects are developed in the following detailed description. In that detailed description reference is had to the accompanying drawing, in which;

FIGURE 1 is a view, in cross section through the axis, of the electrode-containing end portion of a torch in which my invention has been embodied, together with a schematic showing of associated electrical equipment;

FIGURE 2 is a transverse cross-sectional view taken along the line 2—2 of FIGURE 1; and FIGURE 3 is a view similar to a portion of FIGURE 1 but with certain central elements omitted for the better pictorialization of the surrounding element.

Reference being had to FIGURE 1, there will be seen a cylindrical metallic head 1, of length short relative to its diameter. At two points displaced from its axis in opposite directions in the plane of FIGURE 1 the head is traversed by respective holes 8 and 9 parallel to the axis, and from the enlarged rear mouths of these holes there extend rearwardly respective metallic tubes 10 and 11 whose end portions are brazed to the head. These tubes also appear in the transverse cross section of FIGURE 2, in which there will also be seen a third metallic tube 12 whose end portion may also be brazed to the head (at a point obscured in FIGURE 1 by other elements, and without any associated hole through the head). The three tubes 10, 11 and 12 may be surrounded by a unitary cylinder 13, of nylon or other mechanically strong electrically insulating material, whose forward end abuts against the head 1; the cylinder 13 may be held in this relationship to the head and tubes by suitable means (not shown) at the rear extremities of the cylinder and tubes.

The head is provided with an axial bore whose forward portion 2 may have a diameter only moderately less than the separation of the holes 8 and 9 from each other and whose rearward portion 3 is of somewhat reduced diameter. The cylinder 13 is provided with an axial bore whose short forward portion 14 may be of somewhat greater diameter than, and whose next more rearward short portion 15 may be of the same diameter as, that of the head-bore portion 3; an annular rearward projection 4 from the head 1 may fit part-way into the cylinder-bore portion 14, and a rubber or other resilient O-ring 5 may be sealingly compressed between that projection and the shoulder formed between bore portions 14 and 15. Rearwardly of the bore portion 15 the bore of the cylinder 13 may have a portion 16 of slightly reduced diameter and of substantial length, and within this portion 16 there may be secured an internally threaded thin-walled cylindrical insert 17; the further more rearward portion 18 of the cylinder bore may be of a diameter slightly larger than the internal diameter of that insert. The cylinder 13 may be surrounded by a metallic jacket 19 extending forwardly toward but stopping substantially short of the head 1.

Within the head-bore portion 3, cylinder-bore portion 15 and threaded insert 17 there is retained an electrode member 30 in which the electrode proper is included.

To retain that electrode member in that position there may be threaded into the insert 17 a metallic element 20, typically of axial dimension substantially less than that of the insert; the otherwise-cylindrical-and-threaded external surface of the element 20 is provided with three or more flats 21—there having been shown in the transverse FIGURE 2 three such flats, of which only one appears in FIGURE 1—whose function is hereinafter apparent. From the element 20 a metallic tube 22, of somewhat smaller external diameter than and preferably integral with that element, extends rearwardly within and in spaced relationship to the cylinder-bore portion 18; at its rear extremity the tube 22 may be provided with means (not shown) providing for its rotation to adjust the axial position of the element 20. In its forward portion the element 20 is provided with a circular aperture 23 from which there extends rearwardly within the element 20 a socket 24 formed with a self-locking taper (such as a so-called "Morse" taper).

The electrode member 30, which is generally cylindrical, may comprise a metallic tube 31, desirably of good heat conductivity, and extending across the forward end of the tube the electrode proper, itself designated as 35. The external more rearward surface 34 of the tube 31 is shaped with a self-locking taper; this taper is complementary to that of the socket 24 so that when that surface 34 is seated in that socket the electrode member 30 is, until deliberately removed, securely held in the illustrated position. In the surface 34 there may be formed a circumferential recess 33, for example at a longitudinal position such that when the surface 34 is seated in the socket 24 most of that recess lies within that socket; within that recess there may be retained a rubber or other resilient O-ring 32 which serves to insure a fluid-tight seal between the tube 31 and the element 20.

The electrode 35 may be of refractory metal such as tungsten. Its forward portion may have an external diameter similar to that of the forward portion of the tube 31 and, at its periphery, a longitudinal dimension small relative to that diameter; its rearward portion may just fit within the forward mouth of the tube 31, to which it may be secured as by brazing.

The function of the forward face of the electrode 35—and thus of the electrode member 30—is to serve as one terminal, typically the cathode, of an arc stream having the form of an intense and constricted ionized-gas plasma which will issue from the torch and by which, as is known in the art, various functions such for example as cutting may be usefully performed. A purely typical example of the gas may be a mixture of 90% nitrogen and 10% hydrogen.

In order to provide for the constriction of the arc stream the electrode assembly includes a nozzle member 40 extending forwardly from the electrode 35. As seen in FIGURE 1, this nozzle member may be a generally spool-like metallic member coaxial with the head 1 and cylinder 13 and having an axially thick rear end portion 46 fitting within the forward head-bore portion 2, to which it may have a fluid-tight seal provided by a rubber or other resilient O-ring 44 retained within an appropriate peripheral groove in that rear end portion. In its marginal part that rear end portion 46 may be provided with a short rearwardly extending annular projection 45 which seats against the shoulder formed in the head 1 between the bore portions 2 and 3 and which spaces the rear face 41 of the nozzle member a little forwardly of that shoulder. The nozzle member 40 may extend forwardly, from its rear end portion 46, in reduced diameter, and in its forward portion may have a forwardly directed annular surface 48 formed for example on the front of an enlarged-diameter flange 47. From the surface 48 the nozzle member may if desired extend a short distance in again-reduced diameter to form a nozzle tip 49.

In the rear face 41 of the nozzle member there may be provided the rear orifice 42, preferably of diameter a little less than that of the forward portion of the electrode 35; in the nozzle tip 49 there may be provided the front orifice 0 of a much smaller diameter appropriate to the desired constriction of the arc stream. Between the orifices 42 and 0 there may extend the truncatedly conical bore 43 through which the two orifices communicate. The annular projection 45 mentioned above may be considered as forming, within the confines of the nozzle member and in surrounding relationship to the rear orifice 42 (i.e. to the rearward projection of the bore 43) a thin annular space 38; at the inner portion of this space there is formed between the electrode and the rear nozzle-member face 41 a thin annular aperture 39.

The nozzle member 40 may be retained in its described and illustrated position by a metallic cap 50 whose central portion 52 may be centrally apertured to pass the nozzle tip 49. The cap 50 may have a truncately conical portion 53 extending from the portion 52 to adjacent the periphery of the head 1, a cylindrical portion 54 extending rearwardly from the portion 53 in surrounding relationship to the head, and a flared portion 55 extending a short distance diagonally rearwardly from the portion 54 but without contacting the jacket 19 abovementioned. The rear part of the head 1 may be slightly enlarged in external diameter and provided with external screw-threading 7, and the rear part of the cap-member cylindrical portion 54 may be slightly enlarged in internal diameter and provided with internal screw-threading 57, in order to provide for the assembly of the cap. A rubber or other resilient O-ring 6 retained in an appropriate peripheral groove in the head 1 may seal the cap to the head when the cap is assembled to the head. The central cap portion 52 surrounding the nozzle tip 49 may bear rearwardly, for example through a rubber or other resilient O-ring 51, against the annular surface 48 of the nozzle member; the nozzle-tip 49 internally of the O-ring, and the cap portion 53 externally of that ring, may serve to limit its lateral bulging.

In this construction the cap 50 will be seen not only to retain the nozzle member in position but also to form with the head a roughly annular jacketing space 58 about the nozzle member, that jacketing space being fluid-tight other than for the communication therewith of the holes 8 and 9. Those holes may be used as ports for the ingress of cooling fluid into and the egress of fluid from the jacketing space 58; by way of example cool water may be supplied to that space through tube 10 and hole 8 and the water, by which much of the heat of the nozzle will have been absorbed, may be expelled or withdrawn from the chamber through hole 9 and tube 11.

Internally of the electrode member 30 there may extend means for maintaining within that member a flow of cooling fluid. Such means may take the form of a relatively-small-diameter cylinder 25 axial of the torch, supported at its rear end (by means not shown) and extending forwardly first within the tube 22, from which it is spaced by the cylindrical passage 26, and then within the electrode tube 31, from which its reduced-diameter forward portion is spaced by the cylindrical passage 27; it may have its forward open end spaced a little behind the rear surface of the refractory electrode 35. Cooling fluid, for example cool water, may be introduced into the passage 26, from which it will flow forwardly through the passage 27 (meanwhile passing along almost the whole interior surface of the electrode tube 31) to the vicinity of the electrode's rear surface; from there the fluid, by which considerable of the heat of the electrode member will have been absorbed, may be expelled or withdrawn through the cylinder 25. It may be mentioned that through the cylinder 25 (the fluid-circulating system then being out of operation) a long rod or other tool may be passed into impingement against the rear surface of the electrode 35, when it is desired to release the electrode member from its engagement in the tapered socket 24.

The gas which the plasma comprises in ionized form is supplied to the arc stream under suitable pressure in a path surrounding the electrode member 30. For this purpose the gas may be introduced, for example from tube 12 (see FIGURE 2) through a port 28 (whose inner extremity is fractionally seen in FIGURE 1) extending through the appropriate part of the cylinder 13 into the cylindrical space formed between the tube 22 and the bore 18, from which space the gas may flow forwardly past the flats 21 into the short cylindrical space between the insert 17 and the electrode member 30 and thence on forwardly into the longer and thicker cylindrical space between the electrode member and the bores 15 and 3. From the lastmentioned space the gas flows into the thin annular space 38 and aperture 39 mentioned above, from which it in turn passes through the conical bore and the restricted-diameter front orifice O.

As is known in the art, it is desirable that the gas at least in the region from the electrode face to and through the front orifice have a whirling or vortical motion about the axis, which minimizes the axial gas density and encourages the constriction of the arc stream toward the axis—in turn minimizing the heating of the boundary of that region (here the nozzle member 40), and helping to avoid the normal arc stream subdividing longitudinally into two or more arcs (e.g. one from the electrode 35 to a relatively rearward portion of the nozzle member and another from a relatively forward portion of that member forwardly)—an unwanted phenomenon commonly referred to as "double arcing." Such a motion is commonly imparted to the gas by jets directed along transverse straight lines each displaced from the axis, and a preferred longitudinal region at which to impart the motion is to the rear of the electrode face. For there imparting the motion I have found advantageous, both for simplicity of construction and functionally, a different arrangement.

Thus in the structure above described it is necessary only to provide a member surrounding the electrode member and, in the surface of one of these members facing toward the other, helical grooving which with that other member forms a helical conduit through which at least most of the gas is forced to flow. In that structure this is most readily accomplished by inserting, in the cylindrical space between the electrode member 30 and the bore portions 15 and 3, a cylindrical whirler member 60 which may be internally provided with very coarse and for example rectangularly cross-sectioned threading to result in helical grooving 61 such as just described. (Reference may at this point conveniently be had to FIGURE 3, in which the member 60 appears more fully than in FIGURE 1.) Preferably that grooving will be in the form of a plurality, as illustrated two, of separate but interfitted helices 62 and 63. To preserve the electrical independence between the electrode member 30 on the one hand and the nozzle member 40 on the other, the whirler member 60 may be of insulating material, for example a fired ceramic. It need not with precision fit either about the electrode member or within the bore portions, since it is only necessary that most of the gas be forced to flow within its helical grooving 61; neither need it be placed at any precise longitudinal position, for which reason it has been shown as noticeably shorter than the cylindrical space within which it lies (though it may be borne against by the O-ring 5 thereby to preclude random longitudinal movement). The grooving need not extend throughout the entire length of the member, for which reason a small rearward fraction of the member has been shown with a bore 64 which there obliterates the grooving but communicates with the grooving forwardly thereof; such a bore may alternatively or additionally be provided in a small forward fraction of the member without appreciable alteration of function.

It will be appreciated that with the whirler member 60 in position the gas arrives in the thin annular space 38 in an already-whirling state. At this point its further forward movement is precluded by the rear surface 41 of the nozzle member and the inner rim of the projection 45; thereby the helical flow is deflected into a spiral flow contracting through the aperture 39 and along the forward face of the electrode 35 (i.e. of the electrode member 30)—and it is to be appreciated that before its deflection the flow has an opportunity within the thin annular space 38 to become a substantially homogeneous circular flow relatively independent of the actually discrete sources (e.g. helices 62 and 63) through which it arrived at that space. The resulting contracting spiral flow along the electrode face both exerts a strong cooling influence on, and significantly aids in the restriction of the cathode extremity of the final arc stream to a central portion of, that face.

I have found it very desirable, while leaving essentially flat the outer portion of the forward face of the electrode 35, to make the central portion of that face in the form of a substantially conical protuberance against which the contracting spiral flow of gas is directed—i.e. to make that forward face in the form of a substantially flat annulus and of a protuberance, desirably substantially conical, from and surrounded by that annulus. This accomplishes both a maximization of cooling influence of the gas flow on the central or normally active portion of that face, and a smooth and nonturbulent transition from the contracting spiral flow to a helical flow proceeding forwardly through the nozzle member. In connection with the former of those functions it may be considered that there is increased by the protuberance the "wiping" action of the flow on that face. For maximization of the latter function it is desirable that the protuberance be an obtuse one, for example (as illustrated) one of the order of 140° apical angle.

In FIGURE 1 the annular portion of the forward electrode face is designated as 36, while the conical central portion or protuberance is designated as 37.

Although it may have broader utility, the electrode assembly of FIGURE 1 is especially intended for use in a so-called "transferred arc" system, in which after the initiation of an arc stream its anode extremity is transferred to the work—e.g. the material to be cut. It will accordingly be understood that the positive terminal of a D.C. power source P will typically be connected to the work W, while the negative terminal of that source will be connected to the electrode member 30, for example through the medium of the tube 22 and the element 20, as schematically illustrated in FIGURE 1. For the initiation of the arc stream the positive terminal of the source P may be made temporarily connectible, as by temporary closure of a suitable switch S, through a current-limiting resistor R and high-frequency oscillator H to the nozzle member 40, for example via the tube 10 and head 1.

The gas flow having first been established, the switch S may be temporarily closed, whereupon a high-frequency pilot spark will jump between the most closely adjacent portions of the electrode and nozzle members; these portions will be some point at or closely adjacent to the periphery of the forward face of the electrode 35 (i.e. on the annular portion 36) and a therewith-substantially-aligned point on the nozzle-member surface 41. This high-frequency pilot spark will create sufficient ionization so that there will be promptly invoked between those portions a temporary D.C. discharge, limited in maximum magnitude by the resistor R, whose cathode extremity will rapidly extend itself circumferentially around and will then contract somewhat along the electrode face and whose anode extremity will meanwhile shift into a ring on and creeping forwardly along the conical bore 43 toward the front orifice 0.

This temporary discharge will quickly become a limited-current arc stream emerging from, though having as its anode extremity, that orifice. Once it touches the work W (which touching may be facilitated by temporarily bringing the torch and work abnormally close together) the arc stream will preferentially adopt the work as its anode extremity in view of the absence of any current-limiting resistor from the connection of source to work; the temporary connection to the nozzle member 40 may then be broken as by opening of switch S (and the normal spacing of torch and work, if that had been temporarily departed from, restored). The arc stream, now of full magnitude, may typically have a configuration such as approximately shown in dash-dot lines as A in FIGURE 1.

For discharge-initiating purposes there is some optimum magnitude, typically about 0.030", for the spacing between the annular electrode face portion 36 and the rear nozzle-member face 41—i.e., for the thickness of the aperture 39. In practice the electrode member may first be manipulated by turning of the tube 22 so that that electrode face portion 36 contacts that nozzle-member face 41—ability certainly to accomplish this in spite of some tolerance-occasioned divergence of the electrode member 30 from coaxiality with the nozzle member 40 being insured by a restriction of the diameter of the protuberance 37 to appreciably less than that of the rear orifice 42. The electrode member may then be backed off by reverse turning of the tube 22 to a predetermined angular extent, thereby to establish that optimum spacing.

Beside its other advantages the electrode assembly earlier above described has significant advantages especially related to the arc-stream initiation. First, the forward-and-rearward adjustability of the electrode member 30 permits the adjustment, just discussed, of the spacing of the annular face portion 36 from the nozzle-member face 41. Secondly, the support of the electrode and nozzle members relatively to each other remotely from their juxtaposed faces insures that in spite of deviation from coaxiality of those members their faces (i.e. 36 and 41) will remain substantially parallel; this avoids any strong preferentiality of the temporary discharge for any one localized pair of areas and insures the rapid circumferential development of that discharge. Thirdly, although the support in that manner may increase the chance of such deviations from coaxiality, nevertheless the abovementioned restriction of the diameter of the protuberance 37 insures that the protuberance will not take a premature part in the discharge—i.e. that it will come into action as cathode only after the temporary discharge has completed its circumferential development. In these connections it is to be appreciated that the early circumferential development is of two-fold importance: first, it minimizes propensities to double arcing (mentioned above in another connection): secondly, it insures that as the discharge moves onto the central protuberance 37 it will be an already-distributed discharge, thereby minimizing any tendency of the discharge to concentrate and destructively tarry at some localized spot only on the protuberance.

Experience has shown that the electrode and assembly above described results in exceptionally long electrode life. This I attribute not only to the abovementioned interior and surrounding coolings of the electrode member but also and very importantly to the abovementioned cooling of the protuberance 37 by the contracting spiral flow of gas—as well as to the orderly progression of the cathodic action dealt with in the preceding paragraph. When electrode replacement does become necessary it is readily accomplished by simply unscrewing the cap 50 and lifting out the nozzle member 40 and then, in manner indicated above, disengaging the electrode member from the socket 24, after which a new electrode member may be inserted, the nozzle member returned to position and the cap screwed back in place. For the provision of arc streams of different diameters respective nozzle members may be provided, with different-diameter front orifices 0; simple unscrewing of the cap 50 provides access for their interchange.

It will be understood that by the terms "forward," "rearward" and the like I do not imply any particular orientation of the axis of the torch which is very frequently a vertical one.

While I have disclosed my invention in terms of a particular embodiment thereof, I do not thereby intend any unnecessary limitations. Modifications in many respects will be suggested by my disclosure to those skilled in the art, and such modifications will not necessarily constitute a departure from the spirit of the invention or from its scope, which I undertake to define in the following claims.

I claim:

1. In a plasma torch, an electrode assembly including in combination an electrode member having a forward face, a nozzle member having a rear face and a rear orifice in that rear face and a front orifice with which through the nozzle member the rear orifice communicates, said forward face comprising a substantially flat annular portion, said forward face having a transverse dimension at least slightly greater than that of the rear orifice and overlying the rear orifice with its annular portion forming with the rear face a thin annular aperture, the distance between said electrode face and said rear face being a minimum at said annular aperture during normal operation, and means for introducing through said annular aperture a spiral flow of gas contracting along said forward face, said forward face centrally comprising a protuberance against which said spiral flow is directed.

2. The subject matter claimed in claim 1 wherein said protuberance is a substantially conical one.

3. The subject matter claimed in claim 1 wherein said protuberance is an obtuse one.

4. The subject matter claimed in claim 1 wherein said nozzle member is an electrically conductive member electrically insulated from said electrode member, further including means electrically connectible between said members for creating therebetween a starting discharge.

5. The subject matter claimed in claim 1 wherein said protuberance is of transverse dimension appreciably smaller than that of said rear orifice.

6. In a plasma torch, an electrode assembly including in combination an elongated generally cylindrical electrode member having a forward face, a nozzle member having a rear face and a rear orifice in that rear face and a front orifice with which through the nozzle member the rear orifice communicates, said members being supported relatively to each other remotely from said faces whereby their axes are rendered subject to appreciable divergence from each other, and screw means by which one of said members may be moved toward the other to bring the forward electrode-member face into contact with the rear nozzle-member face and may be predeterminedly moevd away from the other to bring said faces to a predetermined interface spacing, said forward electrode member face centrally comprising a protuberance, said protuberance being of transverse dimension sufficiently small for entry of the entire area of the protuberance into the rear orifice in spite of appreciable divergence between said axes.

7. In a plasma torch, an electrode assembly including in combination a generally cylindrical electrode member terminating in a forward face, a member surrounding the electrode member, one of said members in its surface disposed toward the other being provided with helical grooving which with said other member forms a helical conduit, and means connected with the rear extremity of said conduit for supplying gas to said conduit for conduction thereby to the vicinity of the forward electrode-member face.

8. The subject matter claimed in claim 7 wherein said helical grooving is in the form of a plurality of separate but interfitted helices and said conduit is a multiple one.

9. In a plasma torch, an electrode assembly including in combination a generally cylindrical electrode member terminating in a refractory forward electrode face, means for maintaining a helical flow of gas about, and toward the electrode-face end of, the electrode member, and means for deflecting said helical flow into a spiral flow contracting along the electrode face, the electrode face centrally comprising a protuberance against which said spiral flow is directed.

10. In combination with a plasma torch, an electrode of refractory metal having an end surface in the form of a substantially flat annulus and of a protuberance from and surrounded by the annulus, said protuberance being in the form of a cone, the apical angle of which is obtuse, and means for maintaining a flow of gas contracting along the annular portion and being directed against the protuberance.

11. The subject matter of claim 10 in which the electrode is secured across one end of a metal tube, an external portion of the tube adjacent its other end being provided with a self-locking taper.

12. The subject matter claimed in claim 11 wherein said external portion of said tube is further provided with a circumferential recess, further including a resilient O-ring in said recess.

13. In a plasma torch, an electrode assembly including in combination a generally cylindrical electrode member terminating in a refractory electrode face, the electrode face comprising a substantially flat annular portion and a central conical portion extending from said annular portion, the apical angle of said conical portion being obtuse, and means for maintaining a spiral flow of gas contracting along the annular portion and being directed against the conical portion.

14. The subject matter claimed in claim 10 in which the major transverse dimension of said cone substantially equals one half the outer diameter of said annulus.

References Cited by the Examiner
UNITED STATES PATENTS

| | | | |
|---|---|---|---|
| 2,069,623 | 2/1937 | Pickhaver et al. | 314—68 |
| 2,612,394 | 9/1952 | Nelson | 219—99 X |
| 2,726,309 | 12/1955 | Stepath | 219—70 |
| 2,751,482 | 6/1956 | Stepath | 219—70 |
| 2,769,079 | 10/1956 | Briggs | 219—75 |
| 3,007,030 | 10/1961 | Ducati | 219—121 |
| 3,071,679 | 1/1963 | Fetz | 219—120 |
| 3,075,065 | 1/1963 | Ducati et al. | 219—121 X |
| 3,077,108 | 2/1963 | Gage et al. | 219—75 X |
| 3,109,087 | 10/1963 | Larkworthy | 219—120 |
| 3,145,287 | 8/1964 | Siebein et al. | 219—75 |
| 3,171,010 | 2/1965 | Potter | 219—75 |
| 3,210,590 | 10/1965 | Jensen et al. | 313—208 |

JOSEPH V. TRUHE, *Primary Examiner.*

ANTHONY BARTIS, *Examiner.*